(12) United States Patent
Tang

(10) Patent No.: US 11,353,761 B2
(45) Date of Patent: Jun. 7, 2022

(54) DISPLAY PANEL AND METHOD OF MANUFACTURING THE SAME

(71) Applicant: SHENZHEN CHINA STAR OPTOELECTRONICS SEMICONDUCTOR DISPLAY TECHNOLOGY CO., LTD., Guangdong (CN)

(72) Inventor: Aihua Tang, Guangdong (CN)

(73) Assignee: SHENZHEN CHINA STAR OPTOELECTRONICS SEMICONDUCTOR DISPLAY TECHNOLOGY CO., LTD, Guangdong (CN)

( * ) Notice: Subject to any disclaimer, the term of this patent is extended or adjusted under 35 U.S.C. 154(b) by 230 days.

(21) Appl. No.: 16/620,891

(22) PCT Filed: Nov. 19, 2019

(86) PCT No.: PCT/CN2019/119444
§ 371 (c)(1),
(2) Date: Dec. 10, 2019

(87) PCT Pub. No.: WO2021/056769
PCT Pub. Date: Apr. 1, 2021

(65) Prior Publication Data
US 2021/0341776 A1 Nov. 4, 2021

(30) Foreign Application Priority Data

Sep. 29, 2019 (CN) .......................... 201910935905.0

(51) Int. Cl.
*G02F 1/1368* (2006.01)
*G02F 1/1335* (2006.01)
(Continued)

(52) U.S. Cl.
CPC .......... *G02F 1/1368* (2013.01); *G02F 1/1341* (2013.01); *G02F 1/133514* (2013.01); *G02F 1/136286* (2013.01)

(58) Field of Classification Search
CPC ............. G02F 1/1368; G02F 1/133514; G02F 1/1341; G02F 1/136286
See application file for complete search history.

(56) References Cited

U.S. PATENT DOCUMENTS 5,946,060 A * 8/1999 Nishiki ............. G02F 1/134363
349/48
2002/0063835 A1* 5/2002 Kim .................. G02F 1/136209
349/141

(Continued)

FOREIGN PATENT DOCUMENTS

CN 202522819 U 11/2012
CN 104252083 A 12/2014
(Continued)

*Primary Examiner* — Hoan C Nguyen
(74) *Attorney, Agent, or Firm* — Soroker Agmon Nordman

(57) ABSTRACT

A display panel and a method of manufacturing the same are provided. The display pane includes an array substrate and a color filter substrate disposed opposite to each other, and a liquid crystal layer disposed between the array substrate and the color filter substrate. The array substrate includes a transparent electrode layer. The transparent electrode layer includes a pixel electrode and a data line black matrix less (DBS) electrode spaced with each other, a height of the DBS electrode is 0 to 1 micrometer lower than a height of the pixel electrode.

3 Claims, 4 Drawing Sheets

(51) Int. Cl.
   *G02F 1/1341*   (2006.01)
   *G02F 1/1362*   (2006.01)

(56) References Cited

U.S. PATENT DOCUMENTS

| | | | |
|---|---|---|---|
| 2005/0140877 A1* | 6/2005 | Jeoung | G02F 1/133555 |
| | | | 349/114 |
| 2005/0227395 A1* | 10/2005 | Jeoung | G02F 1/136227 |
| | | | 438/30 |
| 2014/0299881 A1* | 10/2014 | Oda | H01L 27/124 |
| | | | 257/59 |
| 2016/0085082 A1 | 3/2016 | Liao et al. | |
| 2016/0216576 A1* | 7/2016 | Miyazaki | G02F 1/136286 |

FOREIGN PATENT DOCUMENTS

| | | |
|---|---|---|
| CN | 104516167 A | 4/2015 |
| CN | 106200175 A | 12/2016 |
| CN | 107479268 A | 12/2017 |

* cited by examiner

DISPLAY PANEL AND METHOD OF MANUFACTURING THE SAME

CROSS-REFERENCE TO RELATED APPLICATION

This application claims the priority of Chinese Application No. 201910935905.0 filed on Sep. 29, 2019 and titled "DISPLAY PANEL AND METHOD OF MANUFACTURING THE SAME", which is incorporated herein by reference in its entirety.

FIELD OF INVENTION

The present disclosure relates to the field of display technologies, and more particularly to a display panel and a method of manufacturing the same.

BACKGROUND OF INVENTION

Liquid crystal displays (LCDs) have many advantages such as thin body, power saving, no radiation, etc. It has been widely used and dominates the flat panel display field. Most of the liquid crystal displays on the existing market are backlight type liquid crystal displays, which include a liquid crystal display panel and a backlight module. The working principle of the liquid crystal display panel is to fill liquid crystal molecules between a thin film transistor array substrate (TFT array substrate) and a color filter substrate (color filter substrate, CF substrate). A driving voltage is applied to the two substrates to control a rotation direction of the liquid crystal molecules to refract light of the backlight module to generate a picture.

Conventional liquid crystal display panels need to have a black matrix (BM) disposed on one side of a color filter substrate to shield light. When applied to a curved liquid crystal display panel, bending the panel causes a shift in a position of the BM, resulting in light leakage and color shift. To solve this issue, the prior art employs a design of data line BM less (DBS), that is reducing the black matrix on the data lines. It is covered with ITO (that is indium tin oxide) traces above data lines. A width of the ITO traces is slightly wider than the data lines. These ITO traces are connected to COM as a common electrode. These ITO COM electrodes are used when the panel is working normally. The formed electric field can maintain the liquid crystal molecules in a state of no deflection, thereby shielding light.

In order to increase a aperture ratio, it is often preferred to remove a shielding metal at a sub-pixel when designing a panel product, and only rely on a DBS electrode to shield light leakage above data lines. This type of design often has issues with insufficient coverage of the DBS electrode, which causes the panel to run the risk of light leakage.

SUMMARY OF INVENTION

In order to solve the above technical problem, an embodiment of the present invention provides a display panel and a method of manufacturing the same.

An embodiment of the present invention provides a display panel, comprising: an array substrate and a color filter substrate disposed opposite to each other, and a liquid crystal layer disposed between the array substrate and the color filter substrate; wherein the array substrate comprises a thin film transistor (TFT) layer and a transparent electrode layer disposed between the TFT layer and the liquid crystal layer; wherein the TFT layer comprises a plurality of TFTs arranged in an array, a plurality of columns of data lines, a plurality of rows of scan lines, and an array substrate common electrode, the TFTs are connected to the data lines and the scan lines, the transparent electrode layer comprises a pixel electrode and a data line black matrix less (DBS) electrode (or called a transparent electrode) spaced with each other, the pixel electrode is connected to the TFTs, and the DBS electrode covers the data lines; wherein a side of the color filter substrate adjacent to the liquid crystal layer is provided with a color filter substrate common electrode; wherein the DBS electrode is connected to the array substrate common electrode; wherein a thickness of the DBS electrode is 0 to 1 micrometer lower than a thickness of the pixel electrode; and wherein the array substrate common electrode and gates of the TFTs are located in a first metal layer; the data lines and sources and drains of the TFTs are located in a second metal layer.

In an embodiment of the present invention, the thickness of the DBS electrode is same as the thickness of the pixel electrode.

In an embodiment of the present invention, the thickness of the DBS electrode is 0.2 micrometer lower than the thickness of the pixel electrode.

In an embodiment of the present invention, the thickness of the DBS electrode is 0.5 micrometer lower than the thickness of the pixel electrode.

In an embodiment of the presentvention, the thickness of the DBS electrode is 1 micrometer lower than the thickness of the pixel electrode.

An embodiment of the present invention further provides a display panel, comprising: an array substrate and a color filter substrate disposed opposite to each other, and a liquid crystal layer disposed between the array substrate and the color filter substrate; wherein the array substrate comprises a TFT layer and a transparent electrode layer disposed between the TFT layer and the liquid crystal layer; wherein the TFT layer comprises a plurality of TFTs arranged in an array, a plurality of columns of data lines, a plurality of rows of scan lines, and an array substrate common electrode, the TFTs are connected to the data lines and the scan lines, the transparent electrode layer comprises a pixel electrode and a DBS electrode spaced with each other, the pixel electrode is connected to the TFTs, and the DBS electrode covers the data lines; wherein a side of the color filter substrate adjacent to the liquid crystal layer is provided with a color filter substrate common electrode; wherein the DBS electrode is connected to the array substrate common electrode; wherein a height of the DBS electrode is 0 to 1 micrometer lower than a height of the pixel electrode.

In an embodiment of the present invention, the height of the DBS electrode is same as the height of the pixel electrode.

In an embodiment of the present invention, the height of the DBS electrode is 0.2 micrometer lower than the height of the pixel electrode.

In an embodiment of the present invention, the height of the DBS electrode is 0.5 micrometer lower than the height of the pixel electrode.

In an embodiment of the present invention, the height of the DBS

An embodiment of the present invention further provides a method of manufacturing a display panel, comprising steps of: step S1, providing an array substrate; wherein the array substrate comprises at array substrate base, a TFT layer is formed on the array substrate base, and a pixel electrode and a DBS electrode are formed on the TFT layer; step S2, providing a color filter substrate; wherein the color filter substrate comprises a color filter substrate base, a color filter substrate common electrode layer is disposed on the color filter substrate, and a color photoresist layer is further disposed between the color filter substrate base and the color filter substrate common electrode layer and step S3, injecting liquid crystal between the array substrate and the color filter substrate to form a liquid crystal layer.

In an embodiment of the present invention, in the step S1, a thickness of the pixel electrode and a thickness of the DBS electrode coincide are same.

In an embodiment of the present invention, in the step S1, a thickness of the DBS electrode is 0.2 micrometer lower than a thickness of the pixel electrode.

In an embodiment of the present invention, in the step S1, a thickness of the DBS electrode is 0.5 micrometer lower than a thickness of the pixel electrode.

In are embodiment of the present invention, in the step S1, a thickness of the DBS electrode is 1 micrometer lower than a thickness of the pixel electrode.

Beneficial effects of the present application are that: in contrast to the prior art, an embodiment of the invention provides a display panel and a method of manufacturing the same. By reducing a vertical height of the DBS electrode relative to the pixel electrode, an electric field range of the data lines can be effectively compressed, light leakage of lower viewing angles on the data lines is significantly reduced, and a vertical crosstalk is improved without reducing an aperture ratio.

DETAILED DESCRIPTION OF PREFERRED EMBODIMENTS

Figure 1:
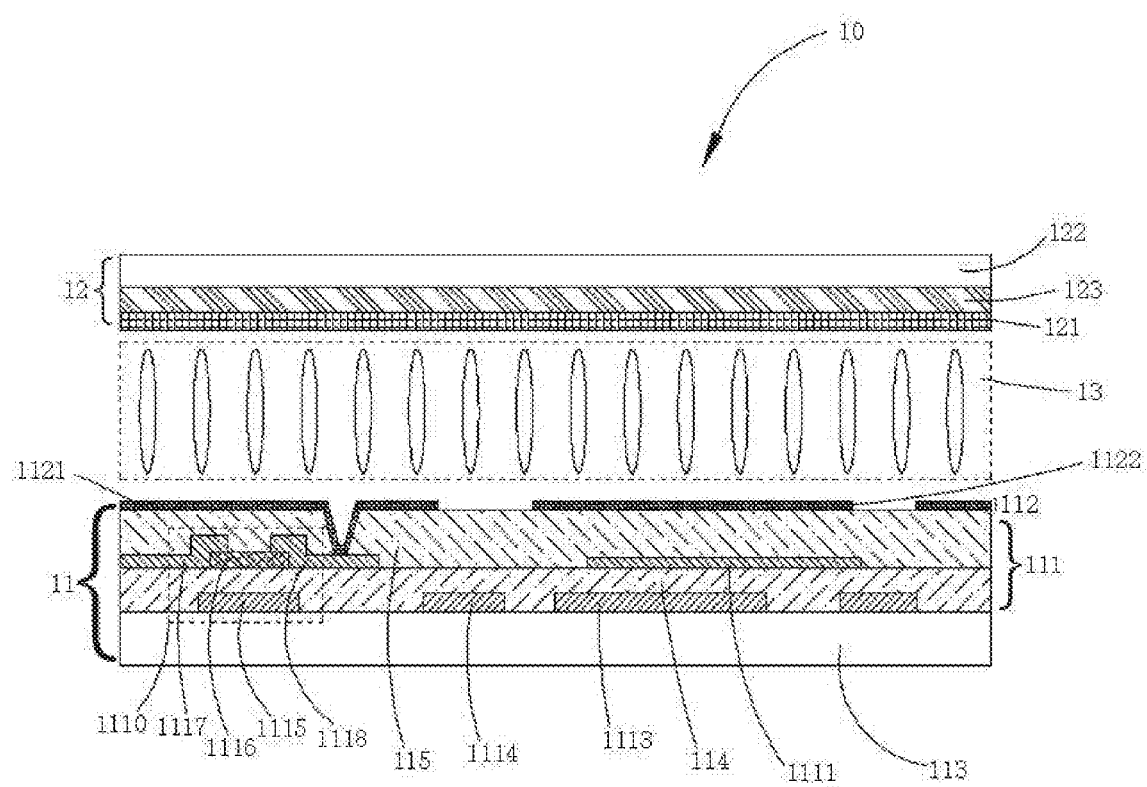
FIG. 1 is a schematic structural diagram of a display panel according to an embodiment of the present invention.

The following description of the various embodiments is provided to illustrate the specific embodiments.

The above and other objects, features, and advantages of the present invention will become more apparent from the understanding of the appended claims. Furthermore, the directional terms mentioned in the present disclosure, such as up, down, top, bottom, front, back, left, right, inner, outer, side, surrounding, center, level, horizontal, vertical, longitudinal, axial, radial, uppermost, or lowermost, etc., only refer to the direction of the drawings. Therefore, the directional terminology used is for the purpose of illustration and understanding of the disclosure.

In the figures, structurally similar elements are denoted by the same reference numerals.

In display panels of the prior art, there are issues of large cross-view vertical crosstalk and light leakage of viewing angles. However, currently feasible crosstalk solutions have different degrees of defects, fir example, increasing a shielding metal will cause issues such as loss of an aperture ratio. The present invention can solve the above defects.

The present invention provides a display panel and a manufacturing method thereof. By reducing a relative height of a DBS electrode and a pixel electrode, light leakage on both sides can be effectively reduced, and crosstalk of a vertical block of upper and lower viewing angles is improved.

Referring FIG. 1, FIG. 1 is a schematic structural diagram of a display panel according to an embodiment of the present invention.

Referring to FIG. 1, an embodiment of the present invention further provides a display panel 10 comprising an array substrate 11 and a color filter substrate 12 disposed opposite to each other, and a liquid crystal layer 13 disposed between the array substrate 11 and the color filter substrate 12; wherein the array substrate 11 comprises a thin film transistor (TFT) layer 111 and a transparent electrode layer 112 disposed between the TFT layer 111 and the liquid crystal layer 13; wherein the TFT layer 111 comprises a plurality of TFTs 1110 arranged in an array, a plurality of columns of data lines 1111, a plurality of rows of scan lines (not shown), and an array substrate common electrode 1113, each of the TFTs 1110 is connected to each of the data lines 1111 and each of the scan lines (not shown), the transparent electrode layer 112 comprises a pixel electrode 1121 and a data line black matrix less (DBS) electrode 1122 spaced with each other, the pixel electrode 1121 is connected to the TFTs 1110, and the DBS electrode 1122 covers the data lines 1111; wherein a side of the color filter substrate 12 adjacent to the liquid crystal layer 13 is provided with a color filter substrate common electrode 121; wherein the DBS electrode 1122 of the display panel 10 is connected to the array substrate common electrode 1113.

A thickness of the DBS electrode 1122 is 0 to 1 micrometer lower than a thickness of the pixel electrode 1121.

Specifically, in an embodiment of the present invention, in the array substrate 11 of the display panel 10, the TFT layer 111 is formed on the array substrate 113, and a passivation layer 115 is disposed between the TFT layer 111 and the transparent electrode layer 112.

Specifically, referring to FIG. 1, each of the TFTs 1110 specifically includes a gate 1115 disposed on the array substrate 113, a gate insulating layer 114 covering the gate 1115, an active layer 1116 disposed on the gate insulating layer 114, and a source 1117 and a drain 1118 respectively connected to the gate insulating layer 114 and connected to two ends of the active layer 1116. The pixel electrode 1121 is connected to the drain 1118 via a via hole penetrating the passivation layer 115.

Specifically, the array substrate common electrode 1113 and the gate electrode 1115 are disposed on the array substrate 113. Further, the TFT layer 111 further includes a light shielding layer 1114 disposed on the array substrate 113 and shielding a gap between the pixel electrode 1121 and the DBS electrode 1122.

Specifically, the data lines 1111 and the source 1117 and the drain 1118 are all located in the second metal layer and are disposed on the gate insulating layer 114.

Specifically, in the color filter substrate 12 of the display panel 10, the color filter substrate common electrode 121 is disposed on the second substrate 122. A color photoresist layer 123 is further disposed between the second substrate 122 and the color filter substrate common electrode 121.

As shown in FIG. 1, in a first embodiment, when heights of the DBS electrode 1122 and the pixel electrode 1121 are same, a maximum light leakage brightness of the display panel 10 is 0.000661.

Figure 2:
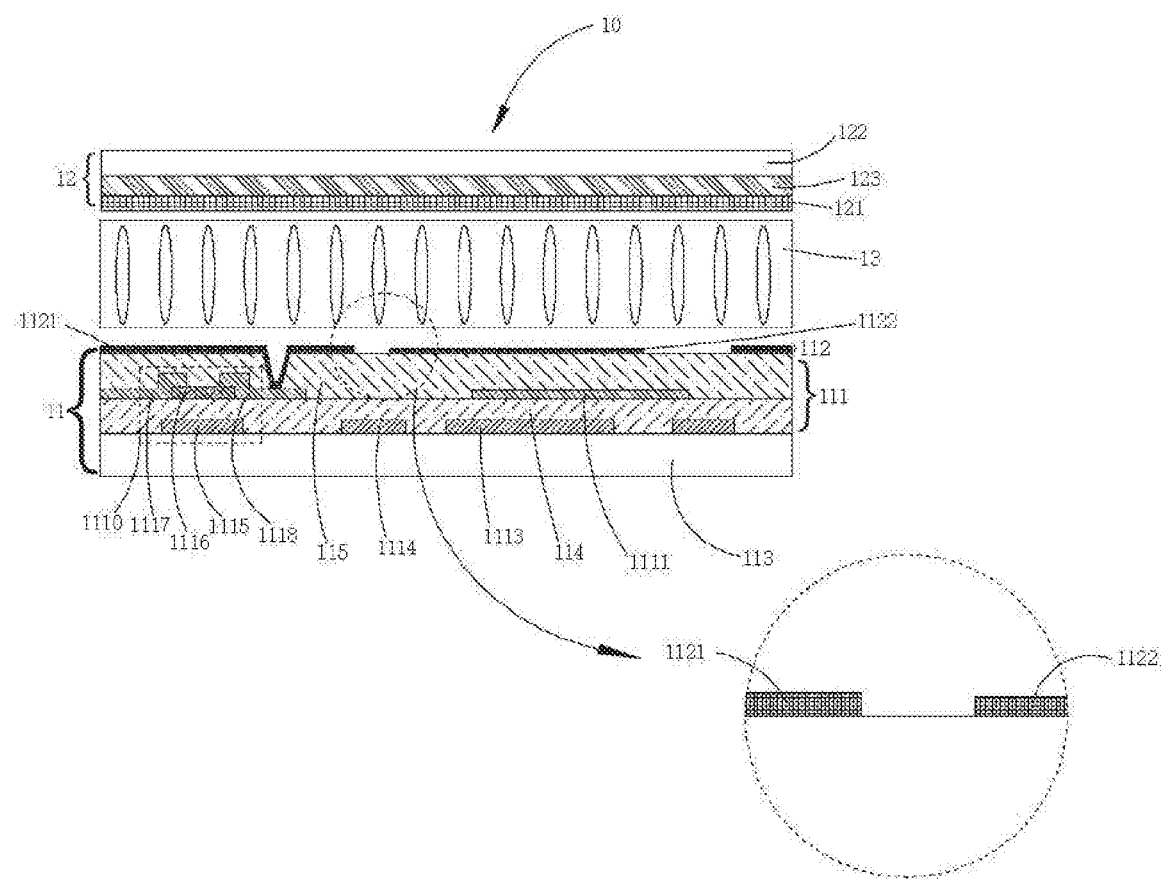
FIG. 2 is a schematic structural diagram of another display panel according to an embodiment of the present invention.

As shown in FIG. 2, the height of the DBS electrode 1122 is lowered, and the height of the DBS electrode 1122 is set to be 0.2 micrometer lower than the height of the pixel electrode 1121, so that the maximum light leakage brightness of the display panel 10 can be reduced to 0.000552, that is, the maximum light leakage brightness of the display panel 10 is reduced by 16% with respect to the maximum light leakage brightness in the first embodiment.

Figure 3:
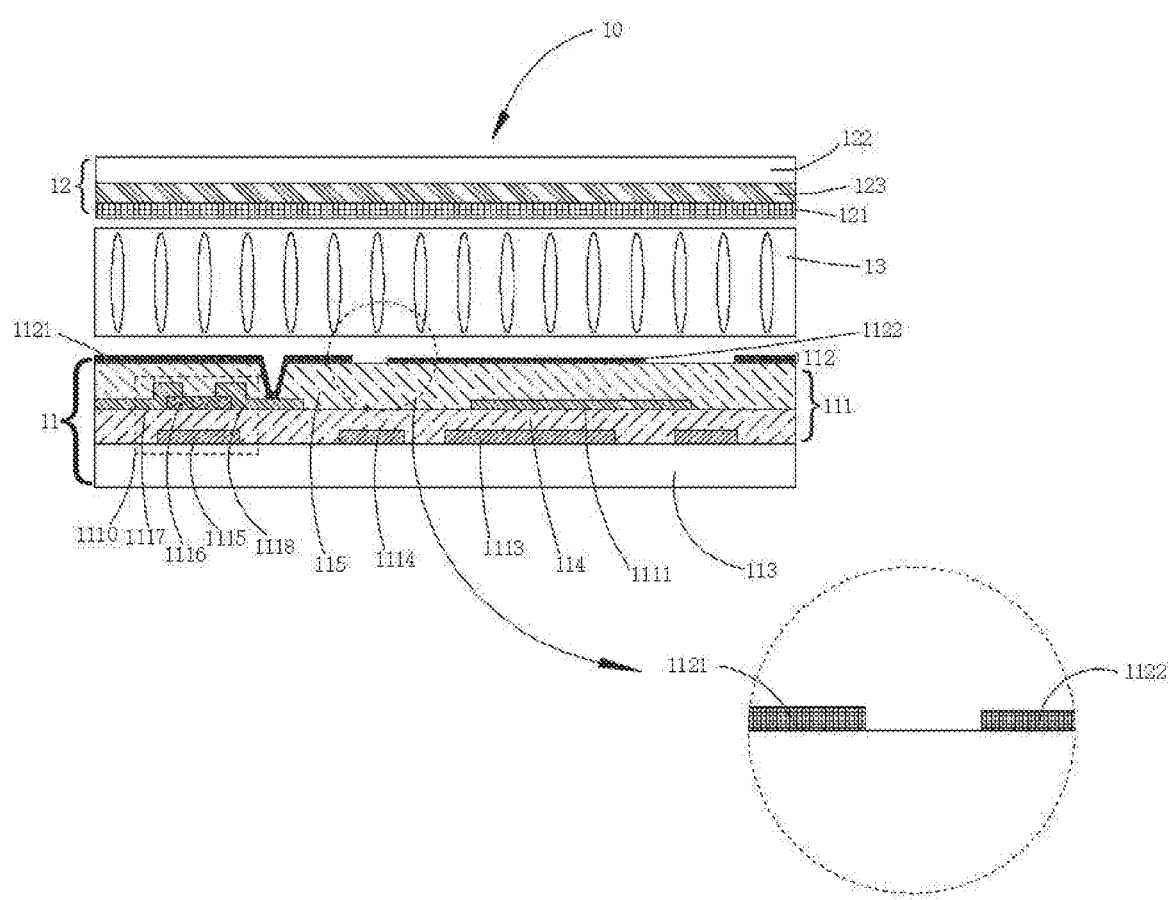
FIG. 3 is a schematic structural diagram of another display panel according to an embodiment of the present invention.

As shown in FIG. 3, the height of the DBS electrode 1122 is lowered, and the height of the DBS electrode 1122 is set to be 0.5 micrometer lower than the height of the pixel electrode 1121, so that the maximum light leakage brightness of the display panel 10 can be reduced to 0.000403, that is, the maximum light leakage brightness of the display panel 10 is reduced by 39% with respect to the maximum light leakage brightness in the first embodiment.

Figure 4:
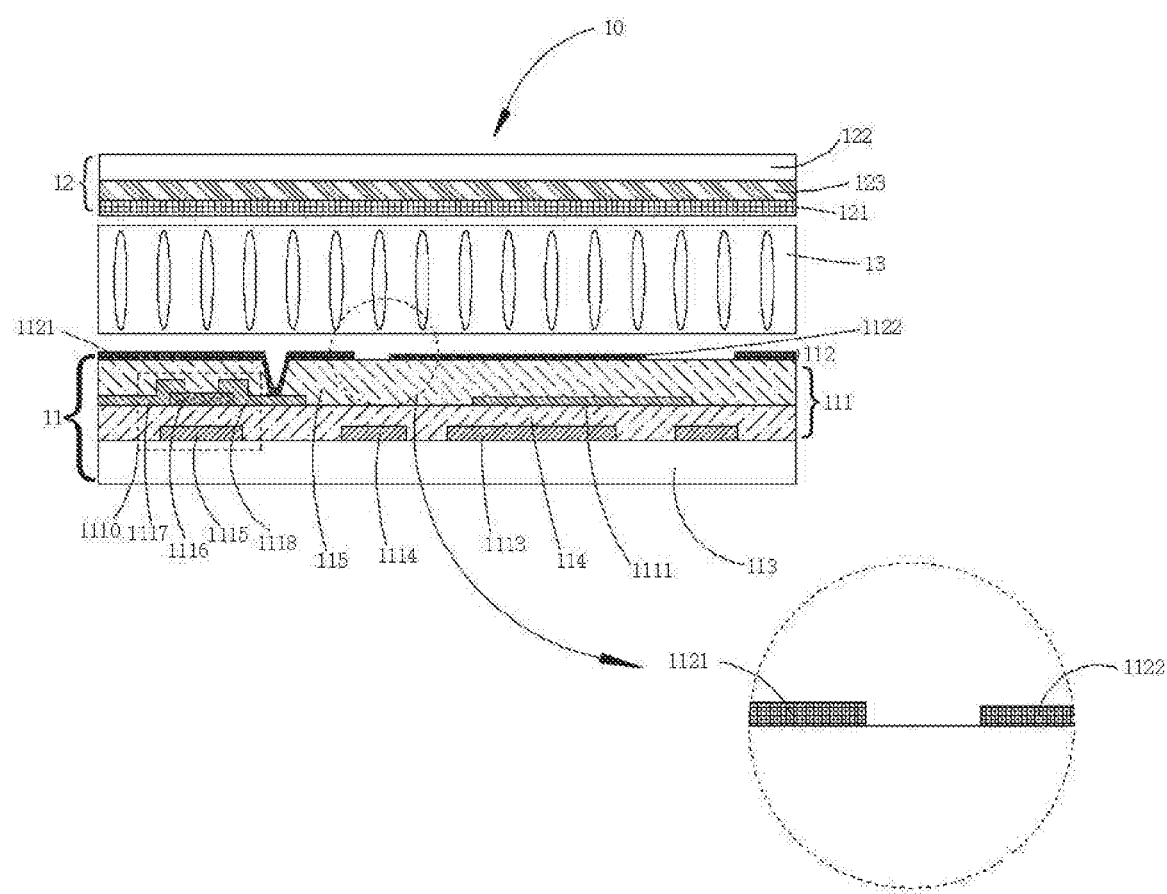
FIG. 4 is a schematic structural diagram of another display panel according to an embodiment of the present invention.

As shown in FIG. 4, the height of the DBS electrode 1122 is lowered, and the height of the DBS electrode 1122 is set to be 1 micrometer lower than the height of the pixel electrode 1121, so that the maximum light leakage brightness of the display panel 10 can be reduced to 0.000199, that is, the maximum light leakage brightness of the display panel 10 is reduced by 70% with respect to the maximum light leakage brightness in the first embodiment. That is, by adjusting the relative heights of the DBS electrode 1122 and the pixel electrode 1121, light leakage of the display panel 10 can be reduced.

An embodiment of the present invention further provides a method of manufacturing a display panel, comprising steps of:

Step S1, providing an array substrate.

The array substrate comprises an array substrate base, a TFT layer is formed on the array substrate base, and a pixel electrode and a DBS electrode are formed on the TFT layer.

Step S2, providing a color filter substrate.

The color filter substrate comprises a color filter substrate base, a color filter substrate common electrode layer is disposed on the color filter substrate, and a color photoresist layer is further disposed between the color filter substrate base and the color filter substrate common electrode layer.

Step S3, injecting liquid crystal between the array substrate and the color filter substrate to form a liquid crystal layer.

In the step S1, the thickness of the DBS electrode is made 0 to 1 micrometer lower than thickness of the pixel electrode. Optionally, not only is the thickness of the DBS electrode lower than the thickness of the pixel electrode by 0 micrometer, the thickness of the DBS electrode can be 0.2 micrometer lower than the thickness of the pixel electrode, the thickness of the DBS electrode can be 0.5 micrometer lower than the thickness of the pixel electrode, and the thickness of the DBS electrode can be 1 micrometer lower than the thickness of the pixel electrode.

The present disclosure has been shown and described with respect to one or more embodiments, and equivalents and modifications will be apparent to those of ordinary skill in the art. The present disclosure includes all such modifications and variations and is only limited by the scope of the appended claims. With particular regard to the various functions performed by the above-described components, the terms used to describe such components are intended to correspond to any component that performs the specified function (e.g., which is functionally equivalent) of the component (unless otherwise indicated). Even if it is structurally not identical to the disclosed structure for performing the functions in the exemplary implementation of the present specification shown herein. Moreover, although specific features of the specification have been disclosed with respect to only one of several implementations, such features may be combined with one or more other features of other implementations that may be desirable and advantageous for a given or particular application. Furthermore, the terms "comprising," "having," "including," or variations thereof are used in the particular embodiments or claims, and such terms are intended to be included in a similar manner to the term "comprising."

The above is only a preferred embodiment of the present disclosure. It should be noted that many modifications and refinements can be made by those skilled in the art without departing from the principles of the present disclosure. These modifications and refinements should also be considered as protection scope of this disclosure.

What is claimed is:

1. A display panel, comprising:
an array substrate and a color filter substrate disposed opposite to each other, and a liquid crystal layer disposed between the array substrate and the color filter substrate;
wherein the array substrate comprises a thin film transistor (TFT) layer and a transparent electrode layer disposed between the TFT layer and the liquid crystal layer;
wherein the TFT layer comprises a plurality of TFTs arranged in an array, a plurality of columns of data lines, a plurality of rows of scan lines, and an array substrate common electrode, the TFTs are connected to the data lines and the scan lines, the transparent electrode layer comprises a pixel electrode and a first transparent electrode spaced with each other, the pixel electrode is connected to the TFTs, and the first transparent electrode covers the data lines;
wherein each of the comprises a gate disposed on the array substrate, a gate insulating layer covering the gate, an active layer disposed on the gate insulating layer, and a source and a drain connected to the gate insulating layer and respectively connected to two ends of the active layer;
wherein a side of the color filter substrate adjacent to the liquid crystal layer is provided with a color filter substrate common electrode;
wherein the first transparent electrode is connected to the array substrate common electrode;
wherein the array substrate common electrode and gates of the TFTs are disposed on the array substrate; the data lines and sources and drains of the TFTs are disposed on the gate insulating layer;
wherein when the thickness of the first transparent electrode is 0.2 micrometer lower than the thickness of the pixel electrode, a maximum light leakage brightness of the display panel is reduced to 0.000552; when the thickness of the first transparent electrode is 0.5 micrometer lower than the thickness of the pixel electrode, a maximum light leakage brightness of the display panel is reduced to 0.000403; and when the thickness of the first transparent electrode is 1 micrometer lower than the thickness of the pixel electrode, a maximum light leakage brightness of the display panel is reduced to 0.000199.

2. A display panel, comprising:
an array substrate and a color filter substrate disposed opposite to each other, and a liquid crystal layer disposed between the array substrate and the color filter substrate;

wherein the array substrate comprises a TFT layer and a transparent electrode layer disposed between the TFT layer and the liquid crystal layer;

wherein the TFT layer comprises a plurality of TFTs arranged in an array, a plurality of columns of data lines, a plurality of rows of scan lines, and an array substrate common electrode, the TFTs are connected to the data lines and the scan lines, the transparent electrode layer comprises a pixel electrode and a first transparent electrode spaced with each other, the pixel electrode is connected to the TFTs, and the first transparent electrode covers the data lines;

wherein a side of the color filter substrate adjacent to the liquid crystal layer is provided with a color filter substrate common electrode;

wherein the first transparent electrode is connected to the array substrate common electrode;

wherein when the thickness of the first transparent electrode is 0.2 micrometer lower than the thickness of the pixel electrode, a maximum light leakage brightness of the display panel is reduced to 0.000552; when the thickness of the first transparent electrode is 0.5 micrometer lower than the thickness of the pixel electrode, a maximum light leakage brightness of the display panel is reduced to 0.000403; and when the thickness of the first transparent electrode is 1 micrometer lower than the thickness of the pixel electrode, a maximum light leakage brightness of the display panel is reduced to 0.000199.

3. A method of manufacturing a display panel, comprising steps of:

step S1, providing an array substrate;

wherein the array substrate comprises an array substrate base, a TFT layer is formed on the array substrate base, and a pixel electrode and a first transparent electrode are formed on the TFT layer;

step S2, providing a color filter substrate;

wherein the color filter substrate comprises a color filter substrate base, a color filter substrate common electrode layer is disposed on the color filter substrate, and a color photoresist layer is further disposed between the color filter substrate base and the color filter substrate common electrode layer; and step S3, injecting liquid crystal between the array substrate and the color filter substrate to form a liquid crystal layer;

wherein when the thickness of the first transparent electrode is 0.2 micrometer lower than the thickness of the pixel electrode, a maximum light leakage brightness of the display panel is reduced to 0.000552; when the thickness of the first transparent electrode is 0.5 micrometer lower than the thickness of the pixel electrode, a maximum light leakage brightness of the display panel is reduced to 0.000403; and when the thickness of the first transparent electrode is 1 micrometer lower than the thickness of the pixel electrode, a maximum light leakage brightness of the display panel is reduced to 0.000199.

* * * * *